(12) United States Patent
Hibino

(10) Patent No.: US 10,335,986 B2
(45) Date of Patent: Jul. 2, 2019

(54) REFLECTIVE DISPLAY DEVICE, INJECTION MOLD, AND METHOD FOR MANUFACTURING REFLECTIVE DISPLAY DEVICE

(71) Applicant: Panasonic Intellectual Property Management Co., Ltd., Osaka (JP)

(72) Inventor: Yukio Hibino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 33 days.

(21) Appl. No.: 15/433,022

(22) Filed: Feb. 15, 2017

(65) Prior Publication Data
US 2017/0252953 A1    Sep. 7, 2017

(30) Foreign Application Priority Data

Mar. 7, 2016  (JP) .................................. 2016-043803
Nov. 22, 2016 (JP) .................................. 2016-226454

(51) Int. Cl.
*B29C 45/00* (2006.01)
*B29K 69/00* (2006.01)
(Continued)

(52) U.S. Cl.
CPC ...... *B29C 45/0053* (2013.01); *B29C 45/0025* (2013.01); *B29C 45/40* (2013.01);
(Continued)

(58) Field of Classification Search
CPC . B29C 45/00; B29C 45/0025; B29C 45/0053; B29C 45/40; B29C 2045/0079;
(Continued)

(56) References Cited

U.S. PATENT DOCUMENTS 3,443,001 A * 5/1969 Adair ..................... B29C 45/38
                                                              264/161
3,637,416 A * 1/1972 Misch .................... A61C 13/02
                                                              428/412
(Continued)

FOREIGN PATENT DOCUMENTS

JP         10-170709         6/1998
JP         2000-039581       2/2000
(Continued)

*Primary Examiner* — David Sample
*Assistant Examiner* — Donald M Flores, Jr.
(74) *Attorney, Agent, or Firm* — Wenderoth, Lind & Ponack, L.L.P.

(57) ABSTRACT

A reflective display device includes a substrate that has a side surface and that is formed by injection-molding, and a vapor-deposited film formed on a first surface of the substrate. Two corner portions on one side of the substrate each have a curved portion, and two corner portions on another side opposite to the one side of the substrate each have a bent edge portion. The substrate includes a level difference portion where a second surface side portion is formed recessed with respect to a first surface side portion with a parting line as a boundary, where the parting line is positioned in such a proportion that the first surface side portion becomes greater than the second surface side portion on an opposite side of the first surface side portion with respect to a width dimension of the side surface of the substrate.

2 Claims, 10 Drawing Sheets

(51) Int. Cl.
*B29L 11/00* (2006.01)
*B29C 45/40* (2006.01)

(52) U.S. Cl.
CPC .. *B29C 2045/0079* (2013.01); *B29K 2069/00* (2013.01); *B29L 2011/0083* (2013.01); *Y10T 428/24355* (2015.01)

(58) Field of Classification Search
CPC ......... B29K 2069/00; B29L 2011/0083; Y10T 428/24355; B32B 3/00; B32B 15/04; B32B 27/325; B32B 2250/02
USPC ...................... 425/436 R, 438, 441, 443, 444
See application file for complete search history.

(56) References Cited

U.S. PATENT DOCUMENTS

| | | | |
|---|---|---|---|
| 3,707,751 A * | 1/1973 | Misch | B29D 11/00865 101/147 |
| 3,708,225 A * | 1/1973 | Misch | B29D 11/0073 101/401.1 |
| 4,715,804 A * | 12/1987 | Takahashi | B29C 45/561 264/328.11 |
| 6,863,521 B2 * | 3/2005 | Petrou | B29C 33/0022 425/468 |
| 8,425,217 B2 * | 4/2013 | Groleau | B29C 45/401 249/67 |
| 2008/0239422 A1 | 10/2008 | Noda | |
| 2013/0188260 A1 | 7/2013 | Matsushita et al. | |
| 2013/0316144 A1 * | 11/2013 | Kikuchi | B29D 11/00048 428/161 |
| 2018/0188533 A1 * | 7/2018 | Ogiwara | B60K 35/00 |

FOREIGN PATENT DOCUMENTS

| | | | |
|---|---|---|---|
| JP | 2008-268873 | 11/2008 | |
| JP | 2012-058688 | 3/2012 | |
| JP | 2014-089324 | 5/2014 | |
| WO | WO-0030830 A1 * | 6/2000 | ......... B29C 45/0025 |

* cited by examiner

REFLECTIVE DISPLAY DEVICE, INJECTION MOLD, AND METHOD FOR MANUFACTURING REFLECTIVE DISPLAY DEVICE

BACKGROUND

1. Technical Field

The present disclosure relates to a reflective display device which can be manufactured by injection molding without cutting, an injection mold, and a method for manufacturing the reflective display device.

2. Description of the Related Art

PTL 1 discloses performing roughening at the same time as cutting a combiner into a predetermined shape, based on cutting conditions of a cutting jig, such as a number of revolutions, a feed rate and the like.

CITATION LIST

Patent Literature

PTL 1: Unexamined Japanese Patent Publication No. 2000-39581

SUMMARY

The present disclosure provides a reflective display device for which a cutting step may be eliminated and the number of manufacturing steps may be greatly reduced and whose yield may be increased, an injection mold for manufacturing the reflective display device, and a method for manufacturing the reflective display device.

The reflective display device of the present disclosure includes a substrate that has a side surface including a surface of arithmetic average roughness of at least 5 μm, and that is formed by injection-molding cycloolefin-based resin, and a vapor-deposited film formed of SiOx (x is 1 or more and 2 or less) formed on a first surface of the substrate. Two corner portions on one side of the substrate each have a curved portion of a radius of at least 1 mm. Two corner portions on another side opposite to the one side of the substrate each have a bent edge portion. The substrate includes a level difference portion where a second surface side portion is formed recessed with respect to a first surface side portion with a parting line as a boundary, where the parting line is positioned in such a proportion that the first surface side portion becomes greater than the second surface side portion on an opposite side of the first surface side portion with respect to a width dimension of the side surface of the substrate.

According to the reflective display device, the injection mold for manufacturing the reflective display device, and the method for manufacturing the reflective display device of the present disclosure, the cutting step may be eliminated and the number of manufacturing steps may be greatly reduced, and also, the yield may be increased.

DETAILED DESCRIPTION

Hereinafter, exemplary embodiments will be described in detail with reference to the drawings as appropriate. However, unnecessarily detailed description may be omitted. For example, detailed description of already well-known matters and repeated description of substantially the same structure may be omitted. All of such omissions are intended to facilitate understanding by those skilled in the art by preventing the following description from becoming unnecessarily redundant.

Moreover, the inventor of the present disclosure provides the appended drawings and the following description for those skilled in the art to fully understand the present disclosure, and does not intend the subject described in the claims to be limited by the appended drawings and the following description.

(Problems)

Manufacturing steps of a conventional combiner are as follows.

In a first step, an intermediate product having a slightly larger size than a desired substrate size is molded of polycarbonate material.

In a second step, the intermediate product is immersed in a hard coating agent for forming a hard coat film, and a hard coat layer is formed on the entire surface of the intermediate product. At this time, controlling the pulling speed of the intermediate product or the like to form a hard coat film of a uniform thickness on both the front and rear surfaces of the intermediate product is difficult. Accordingly, the yield is not high due to unevenness in the thickness of the hard coat film or occurrence of puddle on an outer circumferential side surface, for example.

In a third step, the hard coat film is dried.

In a fourth step, the outer circumferential surface of the intermediate product on which the hard coat layer is formed is cut to cut out a substrate of a predetermined dimension, and the outer circumferential side surface which has been cut is roughened. Reflected light at the outer circumferential portion is thereby reduced, achieving an antireflection effect.

In this manner, four steps are necessary as the manufacturing steps of a conventional combiner.

The present disclosure greatly reduces this large number of steps. The present disclosure provides a reflective display device, an injection mold for manufacturing the reflective display device, and a method for manufacturing the reflective display device, according to which a reflective display device may be manufactured by injection molding, with no cutting, and according to which the number of manufacturing steps may be reduced and the yield may be increased.

First Exemplary Embodiment

In the following, a first exemplary embodiment will be described with reference to FIGS. 1 to 14.

<1-1. Basic Structure of Combiner>

Figure 1:
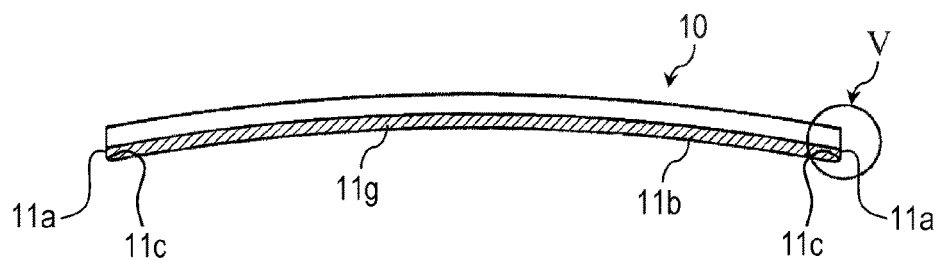
FIG. 1 is a plan view of a combiner, which is an example of a reflective display device according to a first exemplary embodiment.
Figure 2:
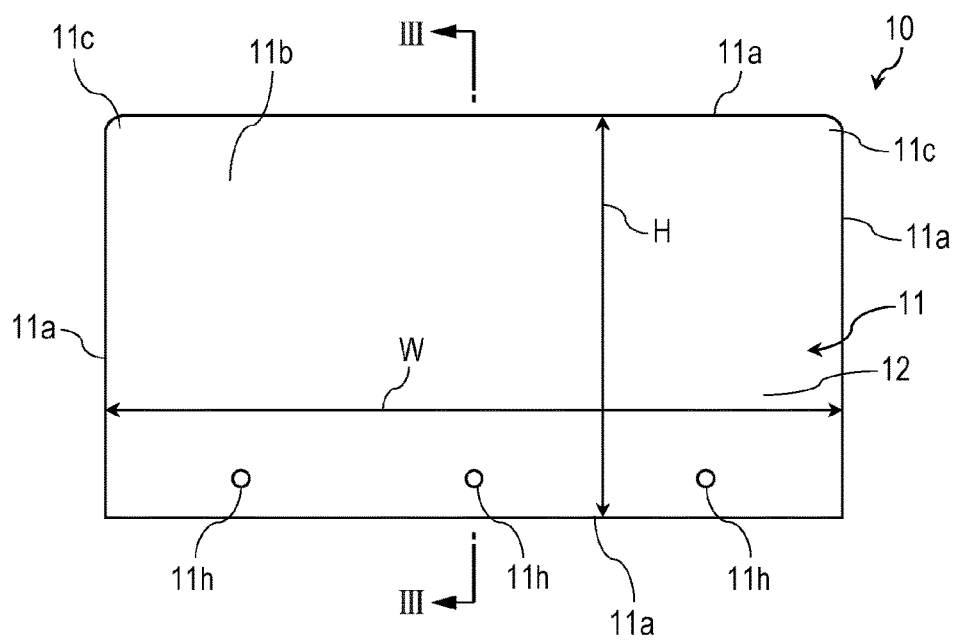
FIG. 2 is a front view of the combiner according to the first exemplary embodiment.
Figure 3:
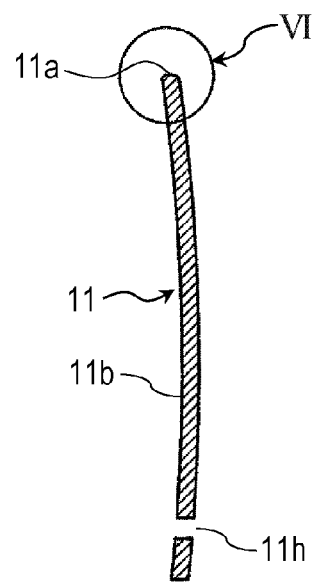
FIG. 3 is a cross-sectional view along line III-III in FIG. 2.
Figure 4:
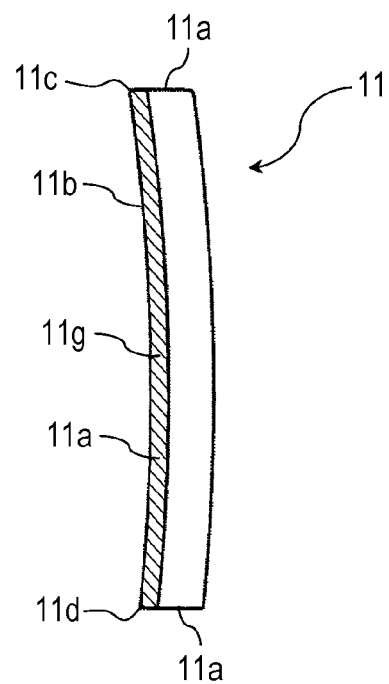
FIG. 4 is a right side view of the combiner according to the first exemplary embodiment.
Figure 5:
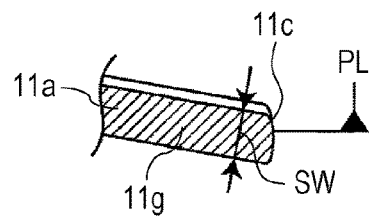
FIG. 5 is an enlarged view of part V in FIG. 1.
Figure 6:
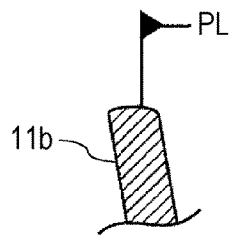
FIG. 6 is an enlarged view of part VI in FIG. 3.

FIG. 1 is a plan view of combiner 10, which is an example of a reflective display device according to the first exemplary embodiment. FIG. 2 is a front view of combiner 10 according to the first exemplary embodiment. FIG. 3 is a cross-sectional view along line III-III in FIG. 2. FIG. 4 is a right side view of combiner 10. FIG. 5 is an enlarged view of part V in FIG. 1. FIG. 6 is an enlarged view of part VI in FIG. 3.

Combiner 10 includes substrate 11 and vapor-deposited film 12.

Substrate 11 is structured by a rectangular plate member obtained by injection-molding a cycloolefin-based resin material. Entire surfaces of upper, lower, left and right side surfaces 11a of substrate 11 are rough surfaces 11g of arithmetic average roughness of at least 5 μm. Such molding is possible if surface texturing is applied such that a cavity inner surface portion corresponding to side surfaces 11a of the mold are made pearskin at the time of injection-molding, for example. This eliminates the need of roughening at later processing.

Additionally, three attachment holes 11h penetrate a lower portion (attachment-side portion) of substrate 11, for example.

Vapor-deposited film 12 is formed of SiOx (x is 1 or more and 2 or less) formed on surface 11b of substrate 11, and structures a surface where an image is to be displayed.

Conventionally, polycarbonate is used as the material for a substrate. A polycarbonate substrate is easily scratched, and requires a hard coat layer. Moreover, the polycarbonate substrate is hygroscopic, and thus, moisture may enter the inside of the substrate from the cut outer circumferential side surfaces to possibly crack the substrate. Also, due to the property of the polycarbonate substrate, birefringence often occurs inside the substrate, and when the substrate is seen through polarized glasses, display at a display portion may be blackened and may not be seen. Accordingly, in the present disclosure, the material of substrate 11 is changed from polycarbonate to cycloolefin-based resin. This increases the surface hardness of substrate 11 so that substrate 11 is not easily scratched, thereby eliminating the need of a hard coat layer. Moreover, due to the property of the cycloolefin-based resin, the water absorption rate is 0.01% or less, and an increase in the moisture resistance may be expected. Furthermore, the conventional problem may be solved because substrate 11 has small birefringence.

The thickness of substrate 11 is 3 mm, for example.

<1-2. Curved Portion of Substrate>

Two corner portions on the upper side of substrate 11 are each semi-spherical curved portion 11c of a radius of at least 1 mm. The radius of curved portion 11c is made smaller than height dimension H or ½ of width dimension W of substrate 11. If the radius is greater than these values, curved portion 11c cannot be formed. Also, if the radius is smaller than 1 mm, a function of curved portion 11c, such as mold separability, cannot be expected. That is, by making the two corner portions on the upper side of substrate 11 curved portions 11c, release from the mold is facilitated at the time of opening of the mold, without substrate 11 being caught by the mold.

<1-3. Edge Portion of Substrate>

Two corner portions on the lower side of substrate 11 are not curved portions, but are each edge portion 11d extending in an X-axis direction, a Y-axis direction and a Z-axis direction, which are orthogonal to one another, for example.

This is for the following reasons. That is, with an injection-molded product such as substrate 11, internal stress of resin concentrates at the edge portions. Accordingly, the pressure of injection and pressure keeping at the time of injection molding is applied more to an edge portion (for example, edge portion 11d) than to a non-edge portion (for example, curved portion 11c), thereby causing an increase in the internal stress and increasing the possibility of being caught by the mold. Accordingly, the two corner portions on the upper side of substrate 11, which are portions on the display portion side of substrate 11, where ejection by an ejector pin is not possible are made curved portions 11c of a radius of at least 1 mm so that application of edge stress on the injection-molded product is reduced as much as possible. On the other hand, the attachment-side portion on the lower portion of substrate 11 where ejection by an ejector pin at the time of mold opening is possible, that is, the two corner portions on the lower side of substrate 11, are made edge portions 11d. An instance of being caught by the mold is thereby made more likely. In other words, extrusion from the mold is made difficult. Therefore, by using the edge stress acting on the injection-molded product, the injection-molded product may be held not by a fixed mold, but by a movable mold.

<1-4. Arrangement of Parting Line PL>

Figure 7:
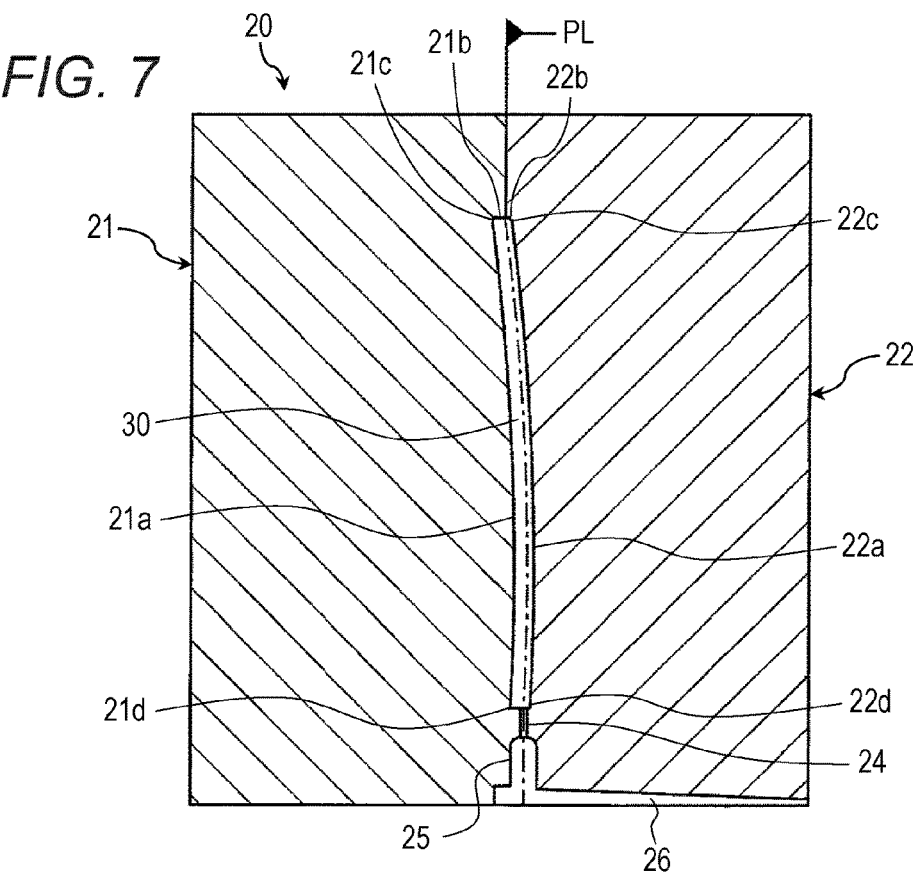
FIG. 7 is a longitudinal cross-sectional view of an injection mold for the combiner according to the first exemplary embodiment.

FIG. 7 is a longitudinal cross-sectional view of an injection mold for the combiner according to the first exemplary embodiment. The product load amount on movable mold 21 side is invariably made greater than the product load amount on fixed mold 22 side so that injection-molded product 30, which is substrate 11, is not caught at fixed mold 22 side. The product load amount here is a side surface load amount at the time of division by parting line PL, which is most influential at the time of mold release, and is a side surface area of injection-molded product 30.

Accordingly, at the time of mold opening at the time of manufacturing, injection-molded product 30 is not held at fixed mold 22 side, but is held at movable mold 21 side. Accordingly, parting line PL is positioned on fixed mold 22 side more than a center of the side area, and injection-molded product 30 is mostly supported on movable mold 21 side. This allows injection-molded product 30 to be easily extruded from fixed mold 22.

Figure 8:
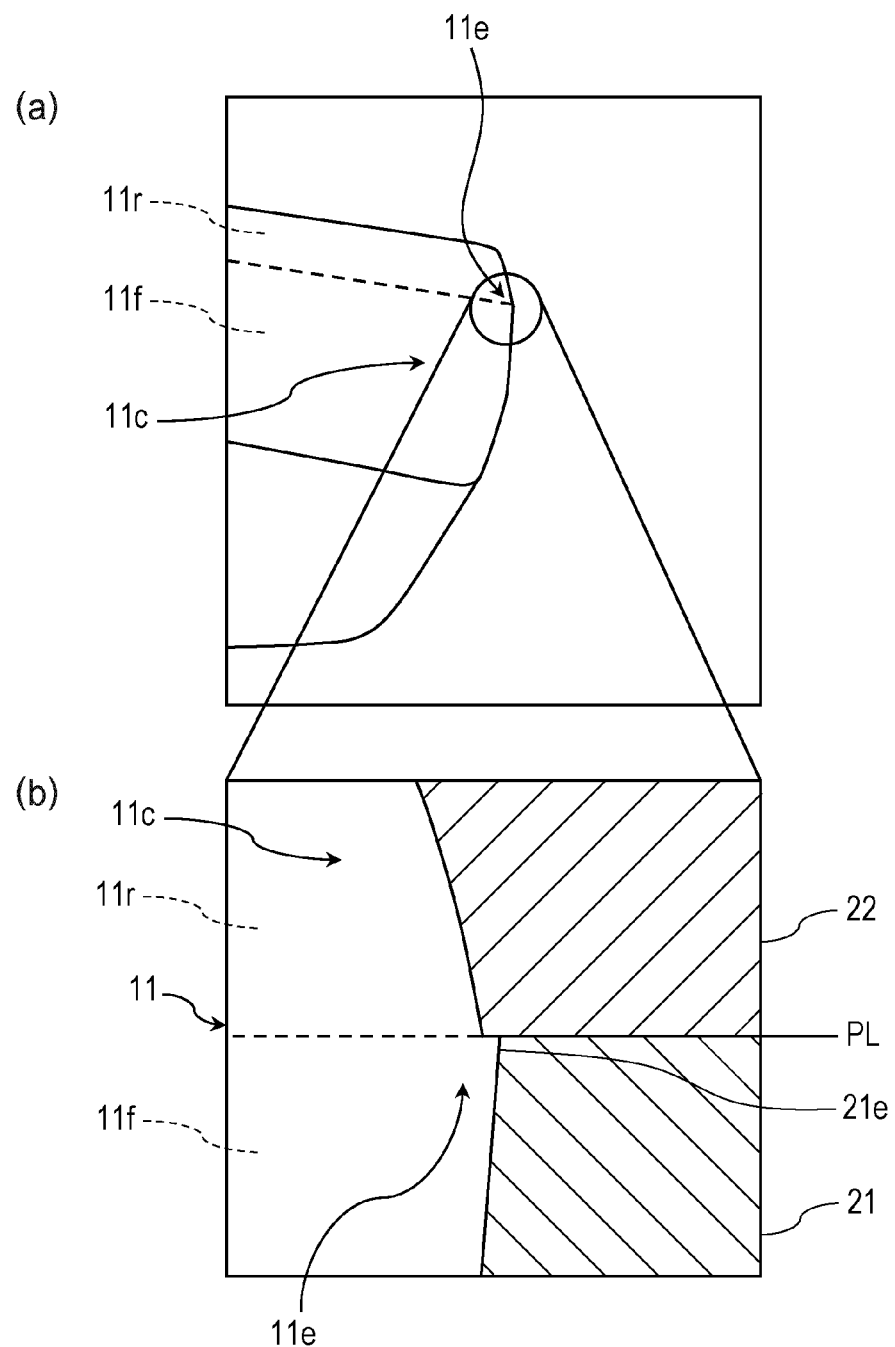
FIG. 8 is an explanatory diagram for describing injection molding of a curved portion, which is one corner portion on an upper side of a substrate of the combiner according to the first exemplary embodiment.

In FIG. 8, (a) is an explanatory diagram for describing injection molding of curved portion 11c, which is one corner portion on the upper side of substrate 11 of combiner 10 according to the first exemplary embodiment, and (b) is an enlarged view of around a level difference portion. Specifically, parting line PL is positioned in such a proportion that front side portion 11f becomes greater than rear side portion 11r with respect to width dimension SW of side surface 11a of substrate 11. Substrate 11 includes level difference portion 11e where rear side portion 11r is formed recessed with respect to front side portion 11f with parting line PL as a boundary. The proportion is front side portion 11f: rear side portion 11r=2:1, for example. Here, front side portion 11f refers to a portion molded by movable mold 21 of injection mold 20, and rear side portion 11r refers to a portion molded by fixed mold 22 of injection mold 20.

<1-5. Step at Parting Line PL>

When an injection-molded product, which is substrate 11 for a combiner, is manufactured by injection mold 20 including movable mold 21 and fixed mold 22, parting line PL is inevitably formed at a clamped portion of the molds. A three-dimensional step is actually formed at parting line PL, and a measure has to be taken such that parting line PL is not seen from the display portion (recessed surface side). In the present exemplary embodiment, the display portion side is protruded so that the step is not seen from the display portion side.

Specifically, as shown in FIG. 8, level difference portion 11e is provided at parting line PL on the outer circumferential side surface. As can be seen by enlarging the encircled part in (a) in FIG. 8 as in the manner of (b) in FIG. 8, the height of front side portion 11f is increased and the height of rear side portion 11r is reduced at level difference portion 11e. According to such a structure, the step is not seen from front side portion 11f side, that is, the display side, and the appearance is improved. Additionally, the step dimension of level difference portion 11e is 30 μm, for example.

<1-6. Basic Structure of Injection Mold>

As shown in FIG. 7, injection mold 20 is made from movable mold 21 and fixed mold 22. Cycloolefin-based resin is injected into injection mold 20, and substrate 11 of combiner 10 is injection-molded.

Movable mold 21 and fixed mold 22 include cavities 21a, 22a, respectively. Cavities 21a, 22a include pearskin portions 21b, 22b, curved portion forming recesses 21c, 22c, and edge portion forming recesses 21d, 22d, respectively.

Pearskin portions 21b, 22b are for forming surfaces of side surfaces 11a of substrate 11 into rough surfaces 11g of arithmetic average roughness of at least 5 μm. Pearskin portions 21b, 22b are disposed around the entire circumference of the side surfaces of cavity 21a, 22a.

Curved portion forming recesses 21c, 22c are for forming curved portions 11c of a radius of at least 1 mm as the two corner portions on the upper side of substrate 11. Curved portion forming recesses 21c, 22c are disposed at two corner portions, of cavities 21a, 22a, on the upper side of substrate 11.

Edge portion forming recesses 21d, 22d are for forming bent edge portions 11d as the two corner portions on the lower side of substrate 11. Edge portion forming recesses 21d, 22d are disposed at two corner portions, of cavities 21a, 22a, on the lower side of substrate 11.

Movable mold 21 and fixed mold 22 are disposed in such a proportion that front side portion 11f becomes greater than rear side portion 11r with respect to width dimension SW of side surface 11a of substrate 11, with parting line PL as the boundary. Cavity 21a of movable mold 21 further includes recess 21e for forming level difference portion 11e where rear side portion 11r is to be formed recessed with respect to front side portion 11f with parting line PL as the boundary.

Additionally, runner 25 and sprue 26 connected via gate 24 are shown on the lower part of FIG. 7. Runner 25 and sprue 26 are necessary for resin to flow. Resin flows through sprue 26, runner 25, gate 24, and to a product.

<1-7. Arrangement of Gate of Injection Mold>

Figure 9:
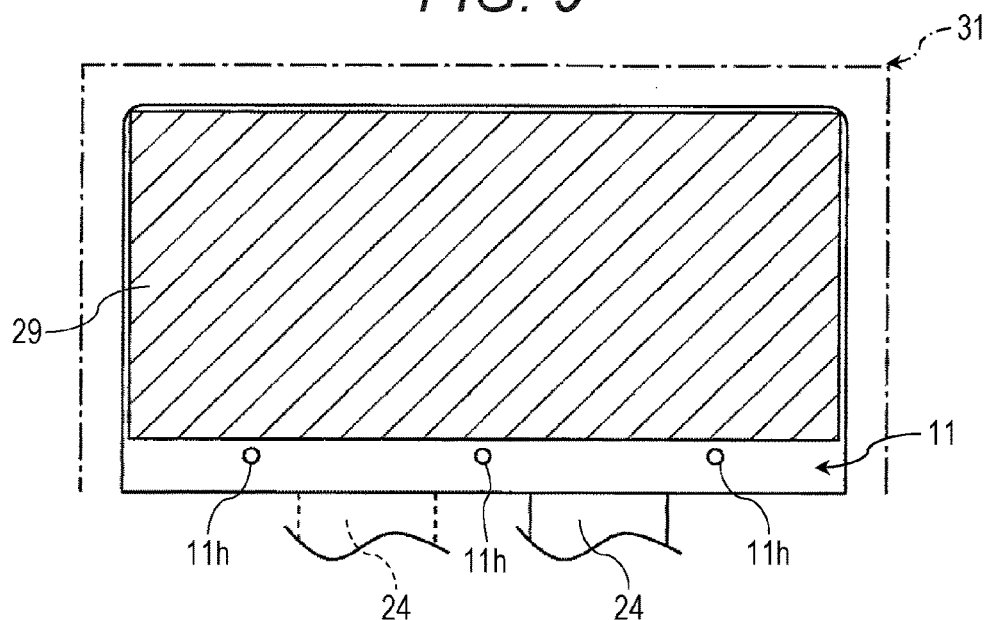
FIG. 9 is an explanatory diagram of arrangement of a gate of the injection mold for the combiner according to the first exemplary embodiment.
Figure 10:
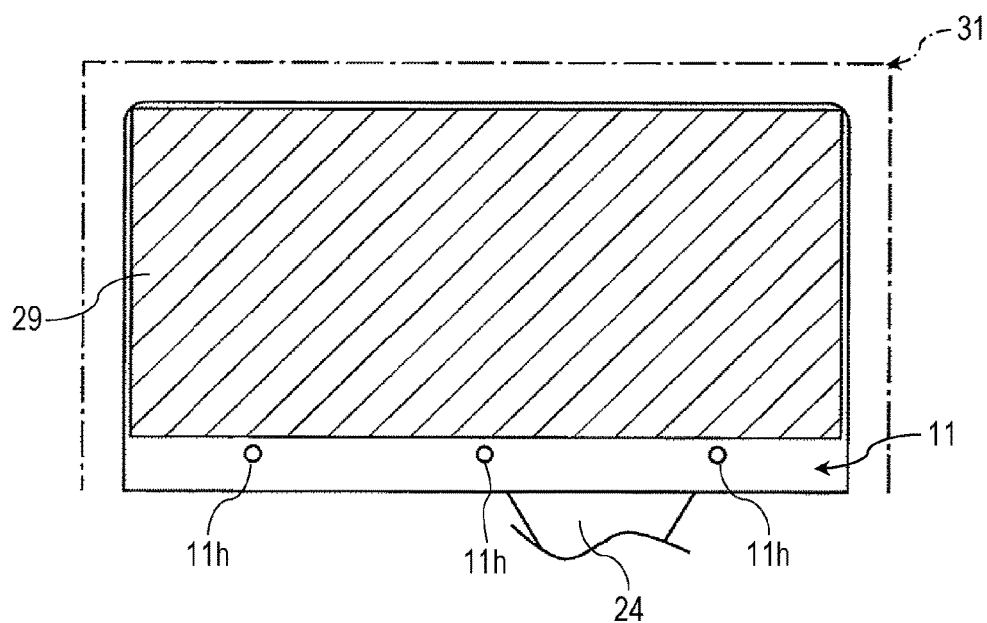
FIG. 10 is an explanatory diagram of arrangement of the gate of the injection mold for the combiner according to the first exemplary embodiment.
Figure 11:
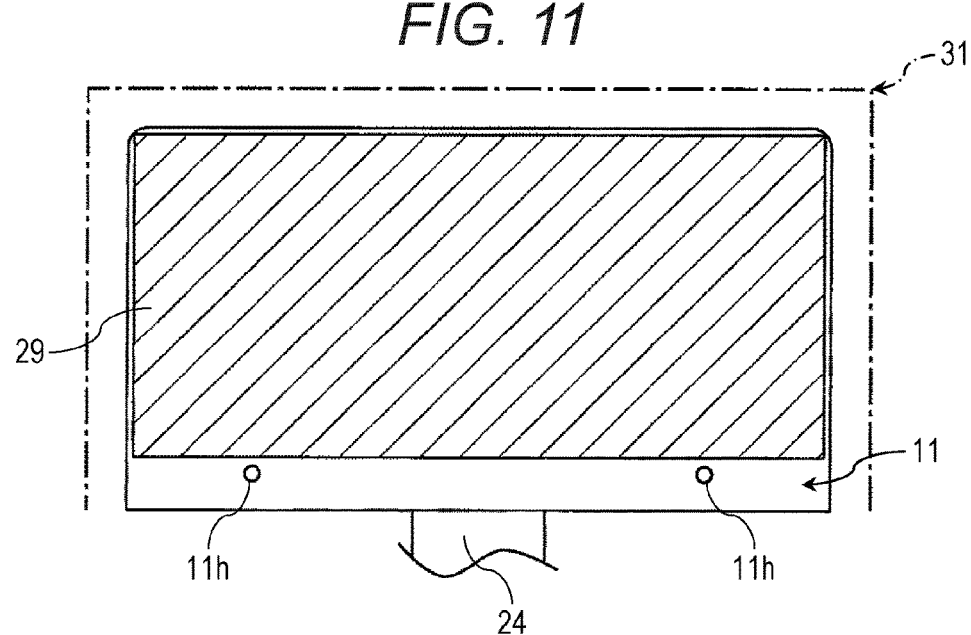
FIG. 11 is an explanatory diagram of arrangement of the gate of the injection mold for the combiner according to the first exemplary embodiment.
Figure 12:
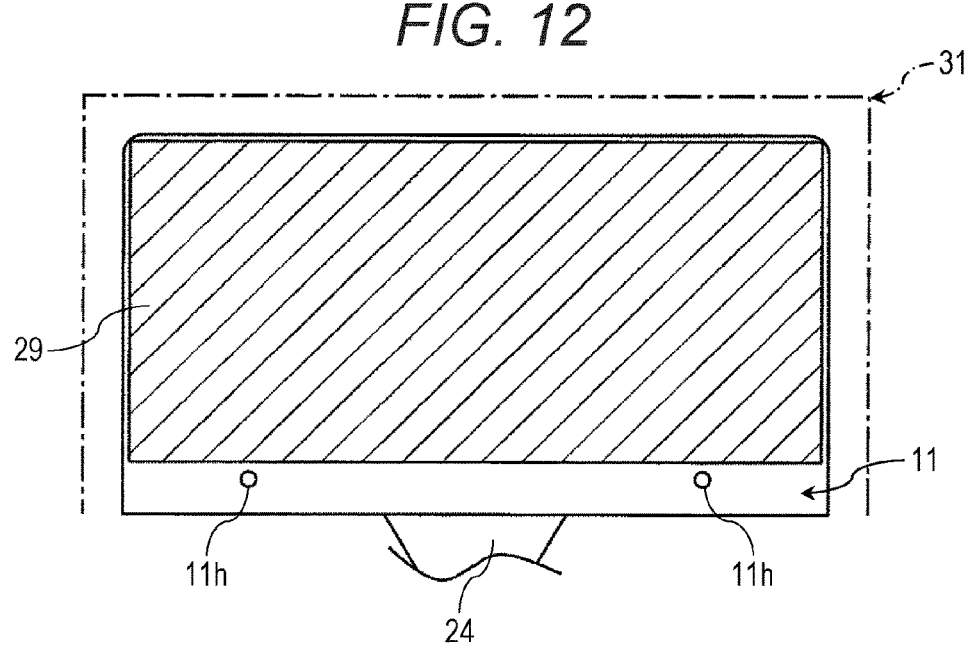
FIG. 12 is an explanatory diagram of arrangement of the gate of the injection mold for the combiner according to the first exemplary embodiment.

FIGS. 9 to 12 are explanatory diagrams of arrangement of gate 24 of the injection mold for the combiner according to the first exemplary embodiment. Left and right side portions and an upper portion of substrate 11 are region 31 where a gate cannot be set, and thus, gate 24 is disposed at the lower portion of substrate 11. At this time, if attachment hole 11h is present at a center of the lower portion of substrate 11, as shown in FIGS. 9 and 10, gate 24 is disposed on the left or the right (dotted line or solid line) of attachment hole 11h. In FIG. 10, gate 24 is shown only on the right side, but gate 24 may be disposed on the left side. Furthermore, as shown in FIGS. 11 and 12, if there is no attachment hole 11h at the center of the lower portion of substrate 11, gate 24 may be disposed at a center position.

FIGS. 9 and 11 show, as gate 24, a side gate of a uniform width, which is widely used. FIGS. 10 and 12 show a fan gate as gate 24.

In FIGS. 9 to 12, a shaded region is display region 29 for a reflected image.

<1-8. Manufacturing Steps of Combiner 10>

Figure 13A:
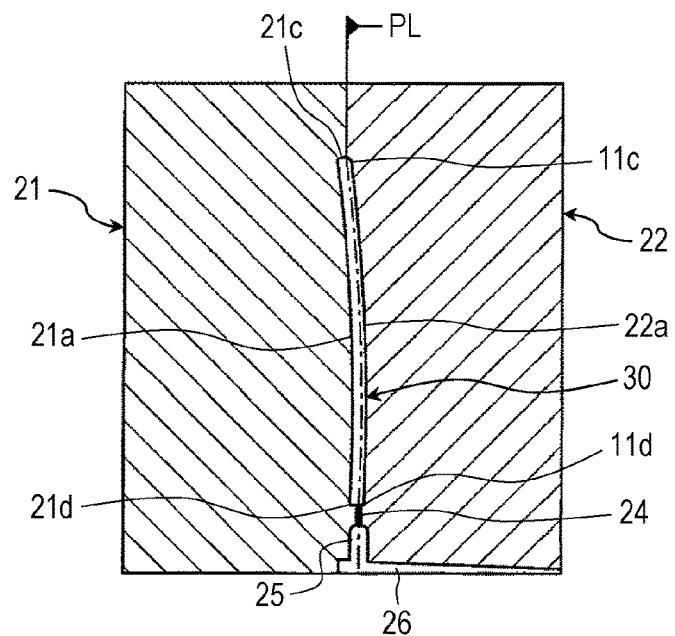
FIG. 13A is an explanatory diagram of a manufacturing step of the combiner according to the first exemplary embodiment.
Figure 13B:
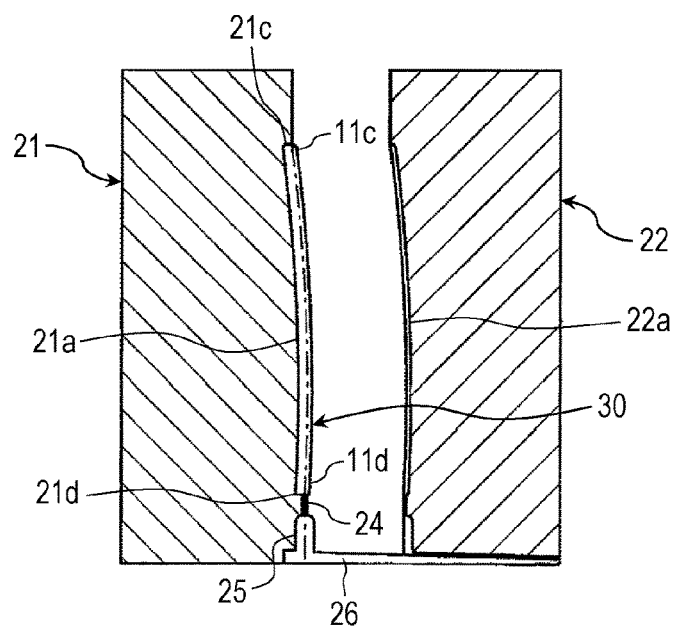
FIG. 13B is an explanatory diagram of a manufacturing step, following the step in FIG. 13A, of the combiner according to the first exemplary embodiment.
Figure 13C:
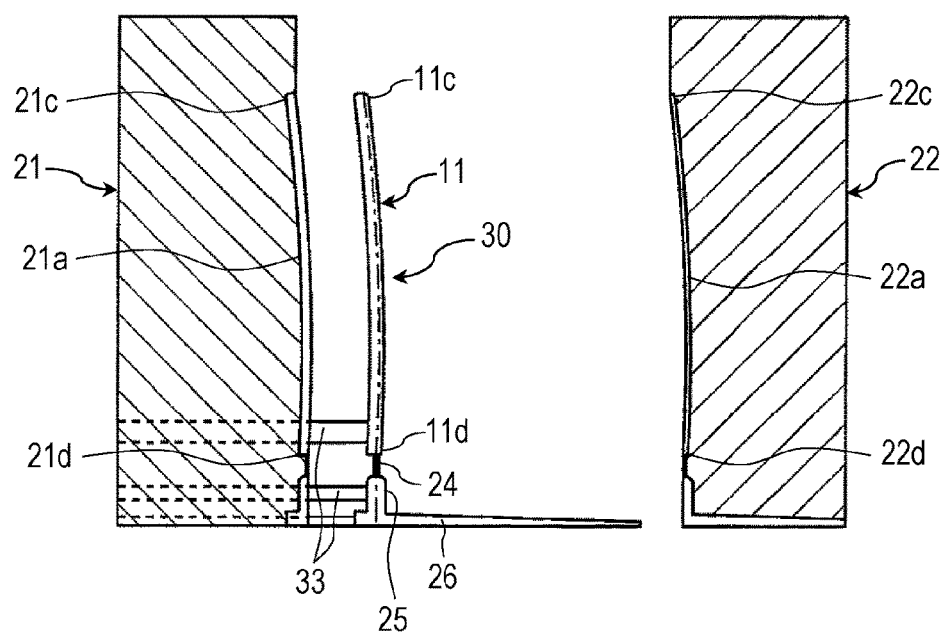
FIG. 13C is an explanatory diagram of a manufacturing step, following the step in FIG. 13B, of the combiner according to the first exemplary embodiment.

Manufacturing steps of combiner 10 are as follows. FIG. 13A is an explanatory diagram of a manufacturing step of combiner 10 according to the first exemplary embodiment. FIG. 13B is an explanatory diagram of a manufacturing step, following the step in FIG. 13A, of combiner 10 according to the first exemplary embodiment. FIG. 13C is an explanatory diagram of a manufacturing step, following the step in FIG. 13B, of combiner 10 according to the first exemplary embodiment.

First, movable mold 21 of injection mold 20 is moved to contact fixed mold 22, and movable mold 21 and fixed mold 22 are clamped together. Substrate 11 of combiner 10 is injection-molded with cycloolefin-based resin (see FIG. 13A). Additionally, an inner surface of fixed mold 22 may be coated with a known mold release agent before clamping as necessary.

Next, because the proportion of the product load amount is greater for movable mold 21 than for fixed mold 22, two curved portions 11c of substrate 11 are held inside curved portion forming recesses 21c of movable mold 21. Two edge portions 11d of substrate 11 are caught inside edge portion forming recesses 21d of movable mold 21 due to the internal stress, and thus, injection-molded product 30 is held by movable mold 21. Movable mold 21 is moved away from fixed mold 22 in this state where injection-molded product 30 is held by movable mold 21, and the molds are opened (see FIG. 13B).

Next, ejector pins 33 are driven, and injection-molded product 30 is ejected and removed from movable mold 21 (see FIG. 13C).

Next, vapor-deposited film 12 for a half mirror formed of $SiO_x$ (x is 1 or more and 2 or less) is formed by vapor deposition on a recessed surface on the display portion side of substrate 11 of injection-molded product 30. Unnecessary parts such as gate 24 are removed at the same time. Then, a thin film of anti-fingerprint agent (not shown) having a thickness of 5 nm, for example, is formed on both surfaces as necessary. At this time, the outer circumferential side surface is also covered by vapor deposition from both the front surface side and the rear surface side. As a result, an anti-fingerprint effect may be achieved also on the outer circumferential side surface.

At the time of forming the vapor-deposited film for a half mirror, control is performed such that vapor-deposited film 12 is not formed on curved portions 11c of the outer circumferential side surface, and reflection from the outer circumferential side surface is thereby prevented.

Conventionally, because cutting is performed, curved portions may not be sufficiently formed on the outer circumferential side surface. In a case where the edge is raised, the vapor-deposited film may be partially attached, thereby causing a negative effect due to reflection.

Manufacturing of combiner 10 is thus completed.

<1-9. Abnormal Release of Injection Mold>

As described above, curved portions 11c are provided at the upper portion of substrate 11, on the display portion side, so as not to accumulate molded component stress which becomes a drawback at the time of mold release. Moreover, edge portions 11d are provided at the lower portion of substrate 11, on the attachment portion side, so that substrate 11 is invariably held on the movable mold side.

Inconveniences that are caused in a case where such structures are not provided will be described. A comparative example is a case where curved portions are not formed to movable mold 21A and fixed mold 22A, and edge portions are provided instead. Also, it is assumed with respect to parting line PL that a front side portion and a rear side portion are 1:1.

Figure 14A:
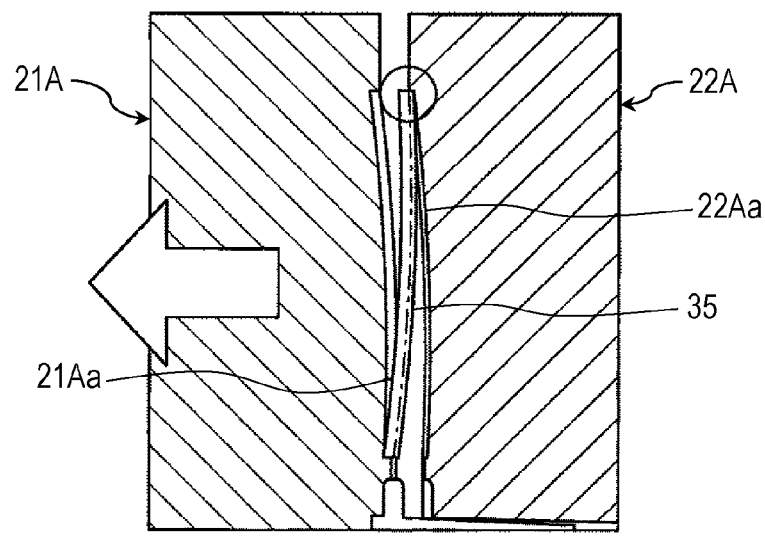
FIG. 14A is an explanatory diagram of abnormal mold opening at a time of injection molding of a combiner of a comparative example.

FIG. 14A is an explanatory diagram of abnormal mold opening at a time of injection molding of a combiner of the comparative example. In the state of abnormal mold opening shown in FIG. 14A, an edge portion on an upper side of injection-molded product 35 is caught by cavity 22Aa of fixed mold 22A. Moreover, an edge portion on a lower side of injection-molded product 35 is caught by cavity 21Aa of movable mold 21A. As a result, the upper portion of injection-molded product 35 is held by fixed mold 22A, and the lower portion of injection-molded product 35 is held by movable mold 21A, and tensile stress is applied to injection-molded product 35. In such a state, attachment of an image display surface of the combiner and a surface of the fixed mold, or interference between an edge of the image display surface of the combiner and the mold results in poor mold release, and causes abnormality in a shape of the image surface of the combiner.

To prevent the state of abnormal mold opening in FIG. 14A, curved portions 11c are formed at two corner portions on the upper side of substrate 11, and also, the proportion of the product load amount is made greater for movable mold 21 than for fixed mold 22. This facilitates extrusion from fixed mold 22 and holding by movable mold 21.

Figure 14B:
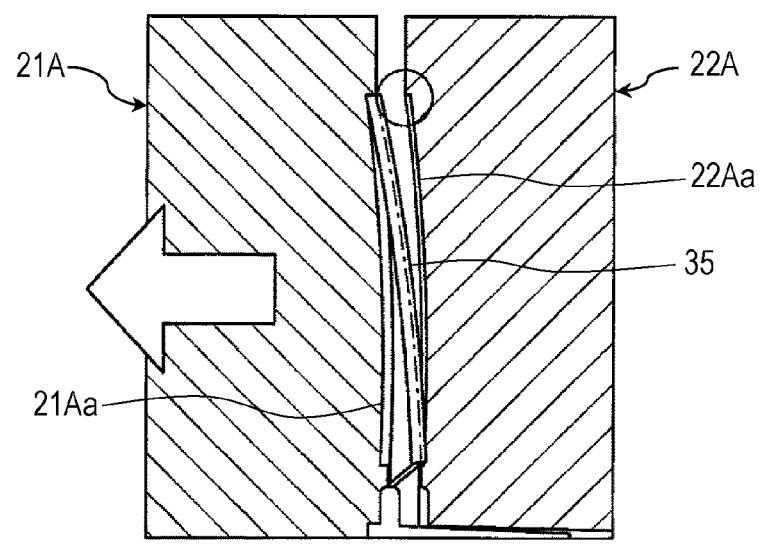
FIG. 14B is another explanatory diagram of abnormal mold opening at a time of injection molding of the combiner of the comparative example.

Next, FIG. 14B is another explanatory diagram of abnormal mold opening at a time of injection molding of the combiner of the comparative example. In contrast to FIG. 14A, in the state of abnormal mold opening shown in FIG. 14B, the edge portion on the lower side of injection-molded product 35 is caught by cavity 22Aa of fixed mold 22A. Moreover, the edge portion on the upper side of injection-molded product 35 is caught by cavity 21Aa of movable mold 21A. As a result, the lower portion of injection-molded product 35 is held by fixed mold 22A, and the upper portion of injection-molded product 35 is held by movable mold 21A, and tensile stress is applied to injection-molded product 35. In such a state, attachment of an image display surface of the combiner and a surface of the fixed mold, or interference between an edge of the image display surface of the combiner and the mold results in poor mold release, and causes abnormality in a shape of the image surface of the combiner.

To prevent the state of abnormal mold opening in FIG. 14B, edge portions 11d are formed at two corner portions on the lower side of substrate 11, and also, the proportion of the product load amount is made greater for movable mold 21 than for fixed mold 22. Accordingly, greater stress is applied to edge portions 11d on movable mold 21 side than fixed mold 22 side, and mold release resistance is increased with respect to movable mold 21 more than fixed mold 22 so that edge portions 11d are easily caught by movable mold 21. This facilitates extrusion from fixed mold 22 and holding by movable mold 21, and the state of abnormal mold opening in FIG. 14B is made less likely to occur.

Additionally, in the present exemplary embodiment, the lower portion of the substrate on movable mold 21 side is later ejected by ejector pins 33, and thus, even if the substrate clings to movable mold 21 side, release from the mold may be stably performed.

Figure 14C:
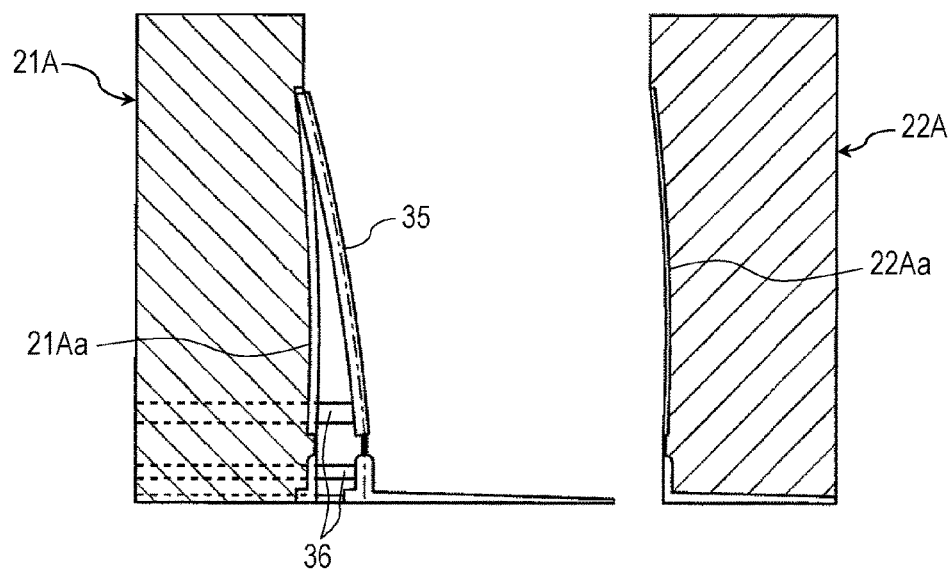
FIG. 14C is further another explanatory diagram of abnormal mold opening at a time of injection molding of the combiner of the comparative example.

Next, FIG. 14C is further another explanatory diagram of abnormal mold opening at a time of injection molding of the combiner of the comparative example. The abnormal mold opening state shown in FIG. 14C is a state where, at a time of opening the molds with injection-molded product 35 held by movable mold 21, and then, removing injection-molded product 35 from movable mold 21 by ejector pins 36, the upper portion of the substrate of injection-molded product 35 is caught inside curved portion forming recess 21c of movable mold 21, and unnecessary stress is applied to injection-molded product 35. In such a state, attachment of an image display surface of the combiner and a surface of the movable mold, or interference between an edge of the image display surface of the combiner and the mold results in poor ejection, and causes abnormality in a shape of the image surface of the combiner.

To prevent the state of abnormal product ejection in FIG. 14C, the balance at the time of ejection is important. By providing curved portions 11c at the corner portions of the upper portion of substrate 11, release from movable mold 21 is facilitated. Moreover, release from the mold may be made difficult by providing edge portions 11d at the corner portions of the lower portion of substrate 11. According to such a structure, at the time of ejection by ejector pins 36, the ejecting force may first be transmitted to the upper portion side of substrate 11 where release from the mold is facilitated, and then, ejection is performed at the lower portion side of substrate 11.

Additionally, in this comparative example, the edge portions are provided, instead of the curved portions, at the corner portions of the upper portion of the substrate, and there is a problem of a stain of a fingerprint, for example. However, such a problem is solved by providing curved portions 11c.

<1-10. Effects>

As described above, according to the reflective display device, the injection mold for manufacturing the reflective display device, and the method for manufacturing the reflective display device according to the present exemplary embodiment, the cutting step is eliminated, and manufacturing by only the injection molding step and the vapor-deposited film formation step is made possible, and the manufacturing steps may be greatly reduced and the yield may be increased.

Particularly, level difference portion 11e is provided at parting line PL on the outer circumferential side surface of substrate 11 of injection-molded product 30 so as to increase the height of front side portion 11f and to reduce the height of rear side portion 11r. According to such a structure, the step at parting line PL is not seen from front side portion 11f side, that is, the display side, and the appearance is improved.

Furthermore, by providing curved portions 11c at the two corner portions on the upper side of substrate 11, which has a rectangular plate shape, of injection-molded product 30, extrusion from fixed mold 22 is facilitated. Moreover, the proportion is such that front side portion 11f is made greater than rear side portion 11r with respect to width dimension SW of side surface 11a of substrate 11. Accordingly, curved portions 11c at the two corner portions on the upper side of substrate 11 are held inside curved portion forming recesses 21c of movable mold 21. In contrast, edge portions 11d at the two corner portions on the lower side of substrate 11 are caught inside edge portion forming recesses 21d of movable mold 21 by the internal stress. Injection-molded product 30 is thereby held by movable mold 21. According to such a structure, the molds may be opened by moving movable mold 21 away from fixed mold 22 with injection-molded product 30 held by movable mold 21. Also at the time of ejecting injection-molded product 30 from movable mold 21 by ejector pins 33, extrusion from movable mold 21 is facilitated by providing curved portions 11c at the two corners on the upper side of substrate 11 of injection-molded product 30. After the upper portion of injection-molded product 30 is extruded from movable mold 21, the lower portion of injection-molded product 30 is removed from movable mold 21 by the ejecting force of ejector pins 33. Accordingly, abnormalities such as attachment of the image display surface of the combiner and the surface of the movable mold and abnormal shape of the image surface of the combiner are not caused in injection-molded product 30, and injection-molded product 30 may be stably removed from movable mold 21.

As described above, a reflective display device corresponding to combiner 10 of the present exemplary embodiment includes substrate 11 which has side surfaces 11a including surfaces of arithmetic average roughness of at least 5 μm, and which is formed by injection-molding cycloolefin-based resin, and vapor-deposited film 12 formed of SiOx (x is 1 or more and 2 or less) formed on a first surface corresponding to surface 11b of substrate 11. Two corner portions on one side corresponding to the upper side of substrate 11 each have curved portion 11c of a radius of at least 1 mm. Two corner portions on the other side corresponding to the lower side opposite to the one side of substrate 11 each have bent edge portion 11d. Substrate 11 includes level difference portion 11e where a second surface side portion corresponding to rear side portion 11r is formed recessed with respect to a first surface side portion corresponding to front side portion 11f with parting line PL as a boundary, where parting line PL is positioned in such a proportion that the first surface side portion corresponding to front side portion 11f becomes greater than the second surface side portion corresponding to rear side portion 11r on the opposite side of the first surface side portion with respect to the width dimension of side surface 11a of substrate 11.

Accordingly, the cutting step may be eliminated, and the manufacturing steps may be greatly reduced and the yield may be increased.

Moreover, the radius of curved portion 11c may be smaller than height dimension H or ½ of width dimension W of substrate 11. This allows substrate 11 to be easily released from the mold without being caught in the mold at the time of mold opening.

Moreover, injection mold 20 for a reflective display device corresponding to combiner 10 of the present exemplary embodiment includes movable mold 21 and fixed mold 22, and forms substrate 11 of the reflective display device corresponding to combiner 10 by injection-molding cycloolefin-based resin. Also, cavities 21a, 22a of movable mold 21 and fixed mold 22 include pearskin portions 21b, 22b for forming surfaces of side surfaces 11a of substrate 11 into surfaces of arithmetic average roughness of at least 5 μm, curved portion forming recesses 21c, 22c for forming curved portions 11c of a radius of at least 1 mm as the two corner portions on the one side corresponding to the upper side of substrate 11, and edge portion forming recesses 21d, 22d for forming bent edge portions 11d as the two corner portions on the other side corresponding to the lower side opposite to the one side of the substrate, respectively. Furthermore, movable mold 21 and fixed mold 22 are disposed in such a proportion that the first surface side portion corresponding to front side portion 11f becomes greater than the second surface side portion corresponding to rear side portion 11r opposite to the first surface side portion with parting line PL as the boundary and with respect to the width dimension of side surface 11a of substrate 11. Moreover, cavity 21a of movable mold 21 includes recess 21e for forming level difference portion 11e where the second surface side portion corresponding to rear side portion 11r is to be formed recessed with respect to the first surface side portion corresponding to front side portion 11f with parting line PL as the boundary.

Accordingly, the cutting step may be eliminated, and the manufacturing steps may be greatly reduced and the yield may be increased.

Furthermore, the method for manufacturing the reflective display device corresponding to combiner 10 of the present exemplary embodiment manufactures the reflective display device corresponding to combiner 10 by using injection mold 20. The manufacturing method of the present exemplary embodiment includes forming substrate 11 by clamping movable mold 21 and fixed mold 22 of injection mold 20 and injection-molding the cycloolefin-based resin, and releasing movable mold 21 from fixed mold 22 while holding injection-molded substrate 11 by movable mold 21. The manufacturing method also includes removing substrate 11 from movable mold 21, and forming vapor-deposited film 12 formed of SiOx (x is 1 or more and 2 or less) on a first surface corresponding to a surface of substrate 11 and manufacturing the reflective display device corresponding to combiner 10.

Accordingly, the cutting step may be eliminated, and the manufacturing steps may be greatly reduced and the yield may be increased.

Other Exemplary Embodiments

Heretofore, the first exemplary embodiment has been described as an example of the technology disclosed in the present application. However, the technology in the present disclosure is not limited to the above exemplary embodiment, and may also be applied to exemplary embodiments which have been subjected to modifications, substitutions, additions, or omissions as required. Moreover, it is also possible to combine the structural elements described in the first exemplary embodiment to obtain new exemplary embodiments.

As described above, the exemplary embodiment has been described as an illustration of the technology of the present disclosure. The appended drawings and the detailed description are provided for this purpose.

Therefore, the structural elements shown in the appended drawings and described in the detailed description include not only structural elements that are essential for solving the problems but also structural elements that are not essential for solving the problems for the purpose of illustration of the technology. Hence, that these non-essential structural elements are shown in the appended drawings and described in the detailed description does not cause these structural elements to be immediately recognized as being essential.

Furthermore, the exemplary embodiments described above are merely for illustrating the technology of the present disclosure, and various modifications, substitutions, additions, omissions, and the like can be performed within the scope of the claims or within an equivalent scope thereof. For example, by combining as appropriate arbitrary exemplary embodiments and variations among the various exemplary embodiments and variations, the effects of the exemplary embodiments or variations may be produced. Also, combinations of the exemplary embodiments, combinations of examples, or combinations of an exemplary embodiment and an example are also possible. Furthermore, combinations of features of different exemplary embodiments or examples are also possible.

The reflective display device, the injection mold, and the method for manufacturing the reflective display device according to the present disclosure may be applied to a combiner which is to be disposed near the window of a vehicle, a vessel, an aircraft or the like, and which is to reflect, toward an observer, light emitted from a display apparatus, for example.

What is claimed is:

1. A reflective display device comprising:
   a substrate that has an upper side surface, a right side surface and a left side surface each including a surface of arithmetic average roughness of at least 5 μm, and that is formed by injection-molding cycloolefin-based resin; and
   a vapor-deposited film for a half mirror formed of SiOx, where x is 1 or more and 2 or less, formed on a display surface of the substrate, the display surface being a first surface,
   wherein, when viewed from the display surface side, two corner portions on an upper side of the substrate each has a curved portion of a radius of at least 1 mm,
   wherein, when viewed from the display surface side, two corner portions on a lower side of the substrate each has an edge portion, and
   wherein, when viewed from the upper side surface, the right side surface and the left side surface, an area of a first surface side portion is larger than an area of a second surface side portion with respect to a parting line for an injection molding as a boundary, the second surface side portion being on an opposite side of the first surface side portion with respect to the parting line, and the substrate includes a level difference portion where the second surface side portion is formed recessed with respect to the first surface side portion with the parting line as the boundary.

2. The reflective display device according to claim 1, wherein the radius of the curved portion is smaller than a height dimension or ½ of a width dimension of the substrate.

* * * * *